United States Patent [19]
Hafner et al.

[11] Patent Number: 5,297,523
[45] Date of Patent: Mar. 29, 1994

[54] TUNED ACTUATING FLUID INLET MANIFOLD FOR A HYDRAULICALLY-ACTUATED FUEL INJECTION SYSTEM

[75] Inventors: Gregory G. Hafner, Normal; Jeffrey C. Huang, Peoria, both of Ill.; Xiangying Liu, Ann Arbor, Mich.

[73] Assignee: Caterpillar Inc., Peoria, Ill.

[21] Appl. No.: 23,770

[22] Filed: Feb. 26, 1993

[51] Int. Cl.$^5$ .......................................... F02M 55/02
[52] U.S. Cl. ................................. 123/456; 123/468; 123/446
[58] Field of Search ............... 123/446, 447, 467, 456, 123/468, 469, 470, 472, 510, 193.3, 193.5

[56] References Cited

U.S. PATENT DOCUMENTS

| | | | |
|---|---|---|---|
| Re. 33,270 | 7/1990 | Beck et al. | 123/446 |
| 4,142,497 | 3/1979 | Long | 123/456 |
| 4,295,452 | 10/1981 | Lembke et al. | 123/470 |
| 4,363,446 | 12/1982 | Jäggle | 123/468 |
| 4,417,557 | 11/1983 | Walter | 123/467 |
| 4,440,132 | 4/1984 | Terada et al. | 123/467 |
| 4,526,151 | 7/1985 | Tateishi | 123/468 |
| 4,719,889 | 1/1988 | Amann et al. | 123/467 |
| 5,007,401 | 4/1991 | Grohn | 123/470 |
| 5,033,435 | 7/1991 | Ostarello et al. | 123/469 |
| 5,033,506 | 7/1991 | Bofinger et al. | 123/467 |
| 5,076,239 | 12/1991 | Mina | 123/496 |
| 5,085,177 | 2/1992 | Ma | 123/52 MB |
| 5,086,743 | 2/1992 | Hickey | 123/468 |
| 5,133,645 | 7/1992 | Crowley et al. | 123/456 |
| 5,168,855 | 12/1992 | Stone | 123/446 |
| 5,176,115 | 1/1993 | Campion | 123/179.17 |
| 5,213,084 | 5/1993 | Linder et al. | 123/456 |

FOREIGN PATENT DOCUMENTS

| | | | |
|---|---|---|---|
| 0019529 | 11/1980 | European Pat. Off. | 123/456 |
| 478120 | 2/1976 | U.S.S.R. | 123/468 |

*Primary Examiner*—E. Rollins Cross
*Assistant Examiner*—Thomas N. Moulis
*Attorney, Agent, or Firm*—Anthony N. Woloch

[57] ABSTRACT

An improved actuating fluid inlet manifold for a plurality of hydraulically-actuated fuel injectors. The manifold includes fluid dynamic tuning apparatus for controlling the flow of relatively high pressure actuating fluid between the common rail passage of the manifold and the injectors. The fluid dynamic tuning apparatus includes a predetermined flow restriction defined in each of the rail branch passages of the manifold. Advantages of the fluid dynamic tuning apparatus include improved injector performance and/or a reduction in structural stresses of various engine components.

13 Claims, 4 Drawing Sheets

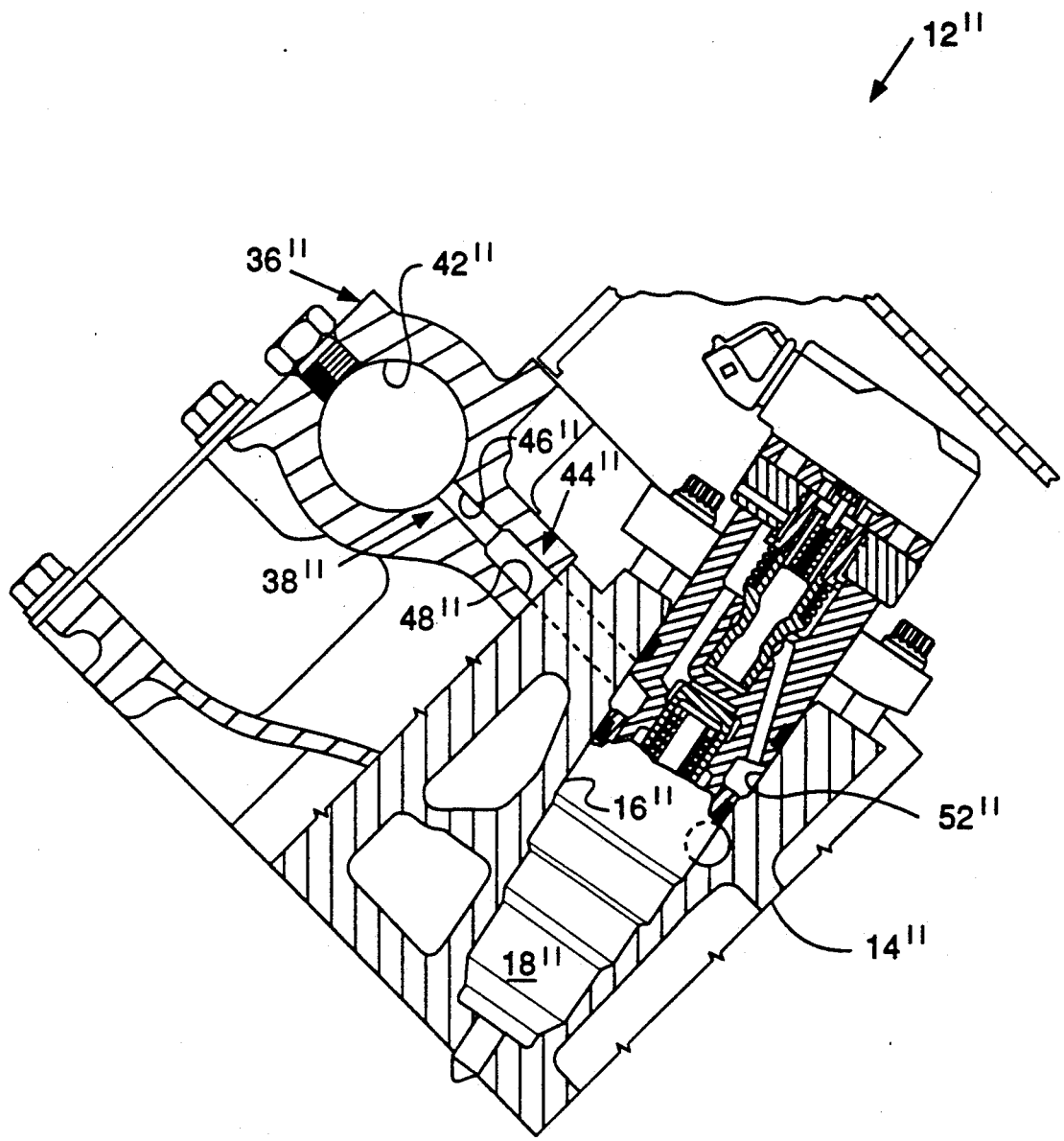
Fig_4

TUNED ACTUATING FLUID INLET MANIFOLD FOR A HYDRAULICALLY-ACTUATED FUEL INJECTION SYSTEM

TECHNICAL FIELD

The present invention relates generally to hydraulically-actuated fuel injector systems and, more particularly to inlet manifolds for supplying actuating fluid to the injectors.

BACKGROUND ART

Known hydraulically-actuated fuel injector systems and/or components are shown, for example, in U.S. Pat. No. 5,168,855 issued to Stone on Dec. 8, 1992, U.S. Pat. No. 5,176,115 issued to Campion on Jan. 5, 1993, and U.S. Pat. No. 5,033,435 issued to Ostarello et al. on Jul. 23, 1991.

In such fuel injector systems, the cyclic operation of the injector and the intermittent communication of high pressure actuation fluid to each injector can i) undesirably add to the structural stresses imposed on various engine components, ii) cause the initial rate-of-injection pressure to be steeper than desired resulting in excessive engine noise and emissions, and/or iii) reducing mean injection pressure.

For example, the fuel injector system disclosed in FIG. 2 of Stone or Campion shows a relatively high pressure actuating fluid inlet manifold comprising a common rail passage and a plurality of rail branch passages. Each rail branch passage intersects a respective annular cavity associated with a respective injector. The annular cavity communicates with an actuating fluid inlet passage of the injector which is selectively opened and blocked by an electronically-controlled valve. When the valve is opened to admit high pressure actuating fluid into the injector, intense pressure waves may propagate between the manifold and the respective injector. These pressure waves may generate unacceptable stresses in the cylinder head generally at the intersection of the rail branch passage and the annulus which may cause component failure. Similarly, when the valve closes to block further communication of actuating fluid into the injector, intense pressure waves may propagate between the manifold and the respective injector which again may induce excessive stresses at the rail branch passage/annulus intersection.

The hydraulically-actuated injectors disclosed in Stone and Campion have a certain amount of inherent control over the initial rate of injection pressure. However, such control may not be always adequate for meeting future stringent emissions standards in some engine applications.

Moreover, conventional hydraulically-actuated injectors typically can have a relatively short injection duration at engine idle conditions. This short injection duration may cause excessive engine noise at idle conditions.

Studies have been conducted in the field of intake/exhaust manifold dynamics for compressible fluids such as air. One notable example is entitled *Internal Combustion Engine Intake Manifold Aspiration Dynamics*, by T. Miyano and M. Hubbard, published on December 1990 in Volume 112 of the Transactions of the American Society of Mechanical Engineers (ASME). In the above study, the length and diameter of the intake manifold pipe and the throttle body upstream pipe length were varied to effect improved volumetric efficiencies of an engine. Air inlet manifold tuning is also disclosed in U.S. Pat. No. 5,085,177 issued to Ma on Feb. 4, 1992. Fuel inlet manifold tuning is disclosed in U.S. Pat. No. 5,076,239 issued to Mina on Dec. 31, 1991 and U.S. Pat. No. 5,086,743 issued to Hickey on Feb. 11, 1992.

However, applicants are not aware of any prior art in the field of hydraulically-actuated injector fuel systems for controlling the flow of relatively high pressure and incompressible hydraulically actuating fluid between an inlet manifold and the injectors.

The present invention is directed to overcoming one or more of the problems as set forth above.

DISCLOSURE OF THE INVENTION

In one aspect of the present invention an actuating fluid inlet manifold is disclosed which is adapted for a hydraulically-actuated injector fuel system having a source of high pressure actuating fluid and a plurality of hydraulically-actuated injectors. The manifold is adapted to be positioned in fluid communication between the source and the injectors. The manifold has fluid dynamic tuning means for controlling the flow of actuating fluid between the manifold and the injectors.

Application of a hydraulically-actuated injector fuel system to a particular engine requires attention to hydrodynamic effects and to the wide range of environmental operating conditions of the engine as defined by customer requirements. The embodiments shown of the present invention provide an actuating fluid inlet manifold that is properly configured for purposes of reducing hydrodynamic effects (i.e., reducing structural stresses), reducing initial rate of injection pressure, increasing injection duration at engine idle speeds, reducing the electrical power requirement for valve actuation, and/or improving mean injection pressure during the main portion of injection. Such embodiments help reduce engine noise, emissions, and/or excessive stresses in various components.

BRIEF DESCRIPTION OF THE DRAWINGS

FIG. 4 is a diagrammatic partial cross-sectional view of a third embodiment of part of the actuating fluid circuit of FIG. 1.

BEST MODE FOR CARRYING OUT THE INVENTION

Figure 1:
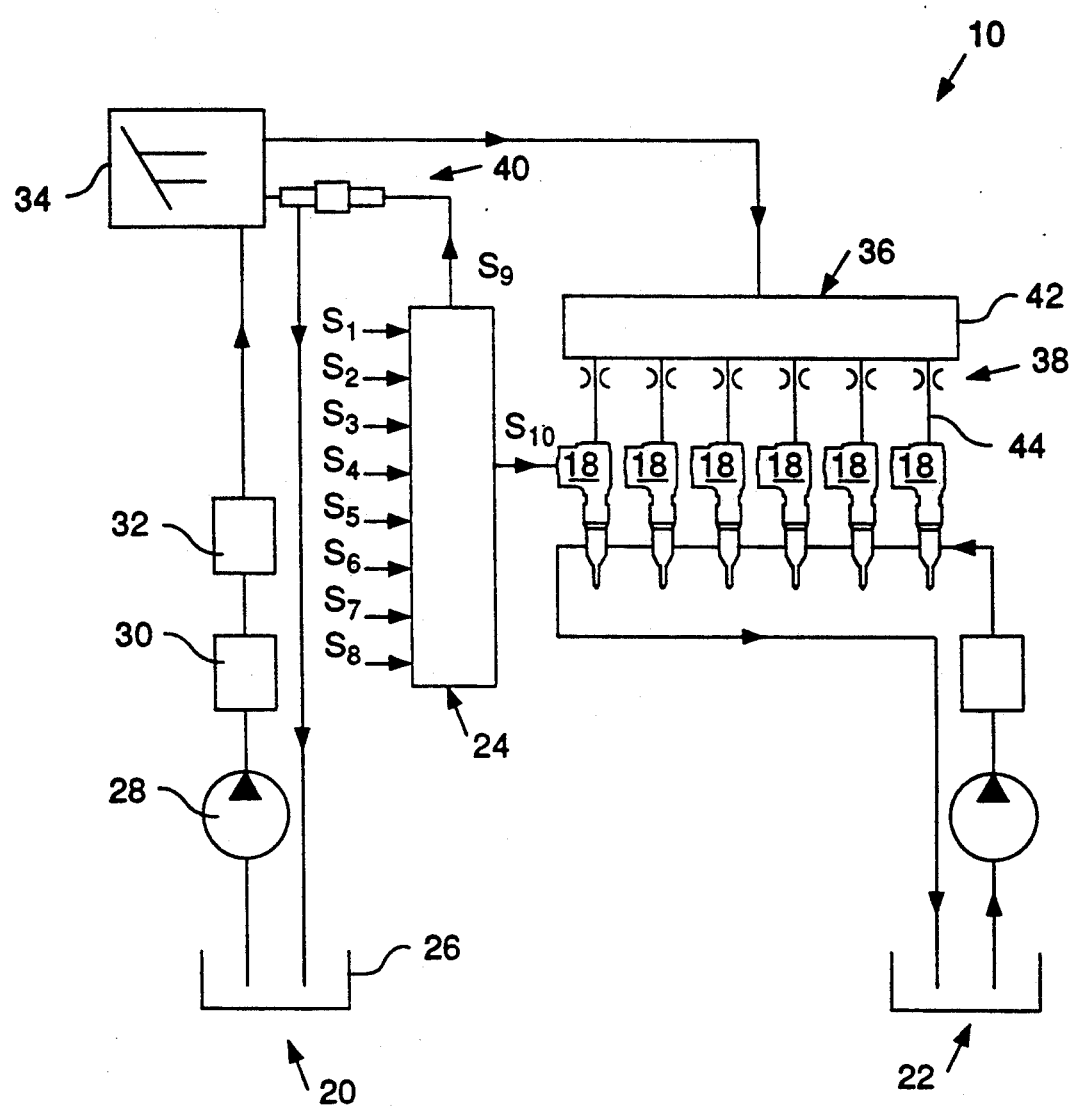
FIG. 1 is a diagrammatic general schematic view of a hydraulically-actuated electronically-controlled injector fuel system of the present invention, including an actuating fluid circuit and a fuel injection circuit, for an internal combustion engine having a plurality of injectors.

Referring to FIG. 1, wherein similar reference numerals designate similar elements or features throughout FIGS. 2–4, there is shown an embodiment of a hydraulically-actuated electronically-controlled injector fuel system 10 (hereinafter referred to as a HEUI fuel system).

The exemplary HEUI fuel system 10 is shown in FIG. 1 as adapted for a direct-injection diesel-cycle internal combustion engine. While the embodiment of FIG. 1 applies to an in-line six cylinder engine, it should be understood that the present invention is also applicable to other types of engines, such as vee-type engines and rotary engines, and that the engine may contain fewer or more than six cylinders or combustion chambers. Referring to FIGS. 2-4, the engine 12 has at least one cylinder head 14. Each cylinder head 14 has one or more unit injector bores 16.

Referring again to FIG. 1, The HEUI fuel system 10 includes one or more hydraulically-actuated electronically-controlled injectors 18, such as unit pump-injectors, adapted to be positioned in a respective bore 16. The system 10 further includes apparatus or means 20 for supplying hydraulically actuating fluid to each injector 18, apparatus or means 22 for supplying fuel to each injector 18, and apparatus or means 24 for electronically controlling the fuel injection quantity, injection timing, and/or actuating fluid pressure of the HEUI fuel system 10. Further details of an exemplary HEUI fuel system 10, not discussed here, are disclosed in U.S. Pat. No. 5,168,855 issued to Stone on Dec. 8, 1992.

The hydraulically actuating fluid supplying means 20 preferably includes an actuating fluid sump 26, a relatively low pressure actuating fluid transfer pump 28, an actuating fluid cooler 30, one or more actuating fluid filters 32, a source or means 34 for generating relatively high pressure actuating fluid such as a relatively high pressure actuating fluid pump 34, at least one relatively high pressure actuating fluid manifold 36, and apparatus or fluid dynamic tuning means 38 for controlling the flow of relatively high pressure actuating fluid between the manifold 36 and the injectors 18.

Preferably, the fluid chosen for the actuating fluid is not fuel but is a relatively incompressible liquid having a relatively higher viscosity than fuel under the same conditions. Preferably, the actuating fluid is engine lubricating oil and the actuating fluid sump 26 is an engine lubrication oil sump.

Preferably, one actuating fluid manifold 36 is provided for and associated with each cylinder head 14 having a bank of injectors 18. Each actuating fluid manifold 36 has one common rail passage 42 and a plurality of mutually spaced rail branch passages 44 extending from the common rail passage 42.

The common rail passage 42 is arranged in fluid communication with and downstream of the relatively high pressure actuating fluid pump 34. The number of rail branch passages 44 for each manifold 36 corresponds to the number of injectors 18 positioned in each cylinder head 14. Each rail branch passage 44 is arranged in fluid communication between the common rail passage 42 and a respective injector 18. Each rail branch passage 44 has a first or upstream portion 46 and also a second or downstream portion 48. The upstream portion 46 is positioned adjacent or at least closer to the common rail passage 42 and the downstream portion 48 is positioned adjacent or at least closer to the respective injector 18.

The fluid dynamic tuning means 38 is designed considering fluid passage pressure drop, dynamic wave timing, and the time delay in accelerating the actuating fluid from the manifold 36 to the respective injector 18. The fluid dynamic tuning means 38 preferably includes a predetermined flow restriction positioned in each rail branch passage 44 of the manifold 36. The flow restriction has a predetermined effective cross-sectional flow area and length and is preferably positioned in the upstream portion (46) of the rail branch passage (44). Alternatively, the upstream portion 46 of each rail branch passage 44 has a predetermined first effective cross-sectional flow area $A_1$ and first length $L_1$. Moreover, the downstream portion 48 of each rail branch passage 44 has a second effective cross-sectional flow area $A_2$ and second length $L_2$. The product of the first area $A_1$ times the first length $L_1$ is less than the product of the second area $A_2$ times the second length $L_2$.

Figure 2:
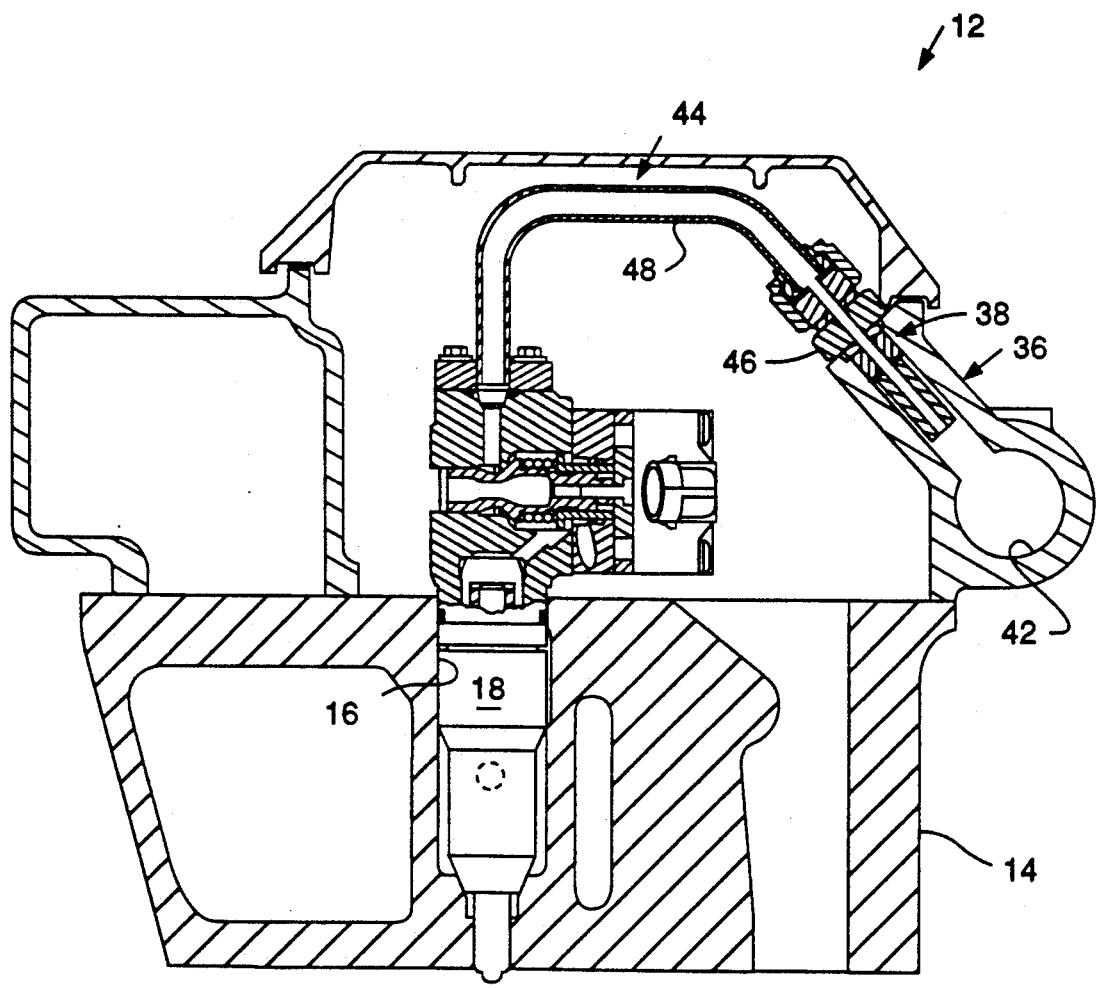
FIG. 2 is a diagrammatic partial cross-sectional view of a first embodiment of part of the actuating fluid circuit of FIG. 1.
Figure 3:
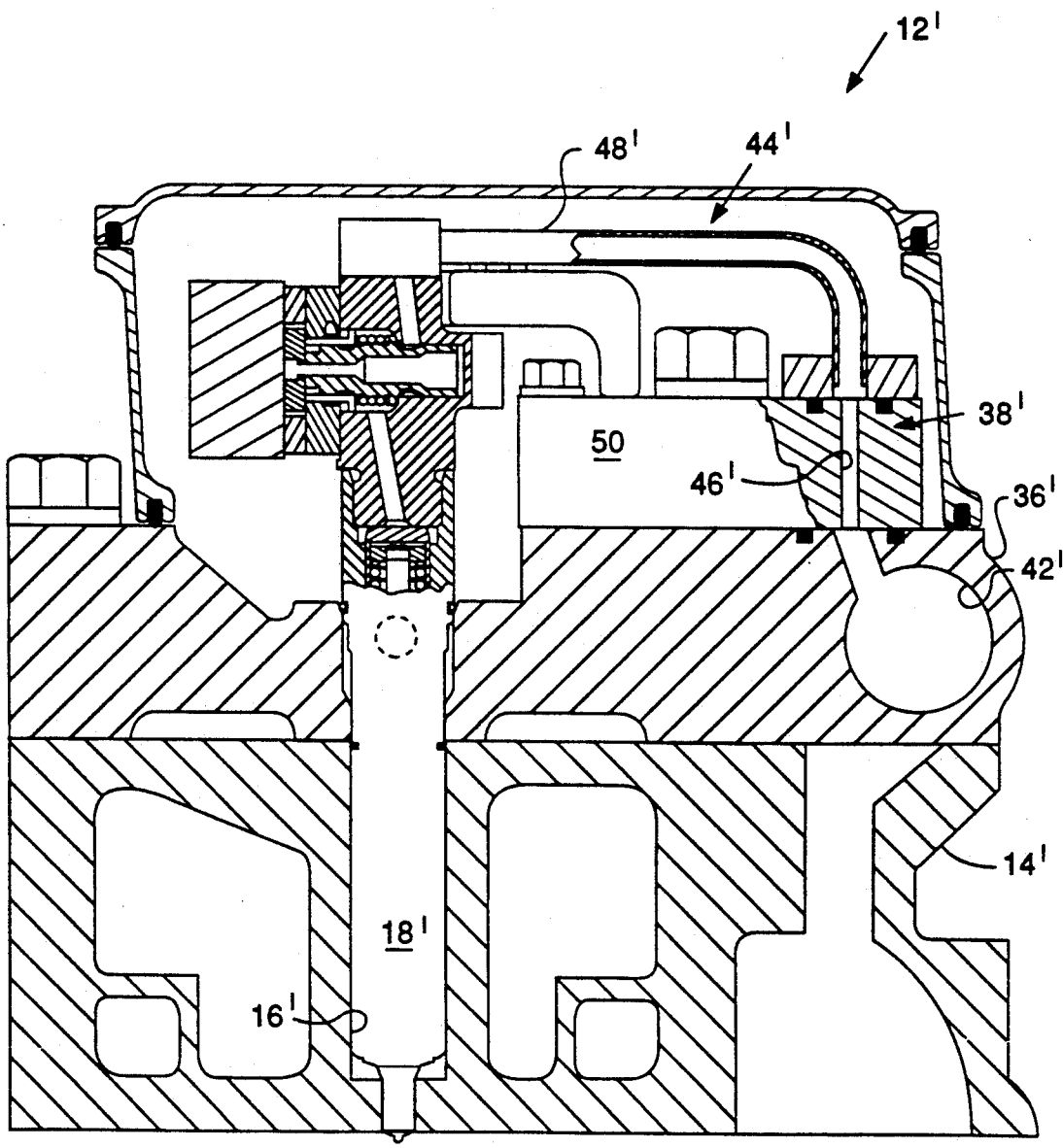
FIG. 3 is a diagrammatic partial cross-sectional view of a second embodiment of part of the actuating fluid circuit of FIG. 1.

Three alternative embodiments of the fluid dynamic tuning means 38 are shown in FIGS. 2-4. In the first and second embodiments of FIGS. 2 and 3, the downstream portion 48 of each rail branch passage 44 includes a jumper tube or external line connected to a respective injector 18. Preferably the jumper tubes are seamless steel tubing and all fittings are of the Society of Automotive Engineers (SAE) standard O-ring port type. Since each jumper tube 48 is connected to a respective injector 18 with a high pressure fitting, structural stress levels do not need to be as carefully controlled as in the case of an rail branch passage 44 integrally formed with a cylinder head 14.

In the first embodiment of FIG. 2, the upstream portion 46 of each rail branch passage 44 includes a removable fitting having an internal passage defining the predetermined flow restriction. Thus, the flow restriction may be easily changed by replacing the fitting with another having a different flow restriction. The inside diameter and length of both the manifold-side fitting 46 and the jumper tube 48 have been properly selected to control the initial rate of injection and to improve the mean effective injection pressure.

In the second embodiment of FIG. 3, the upstream portion 46' and flow restriction of each rail branch passage 44' is internally defined by an engine member 50. In the embodiment of FIG. 3, the engine member 50 is a rocker arm base.

In the third embodiment of FIG. 4, each rail branch passage (44) is integrally formed and internally disposed within at least one engine member, such as an air intake manifold and/or cylinder head 14'''. The downstream portion 48 of each rail branch passage 44 communicates with an annulus 52 defined by a respective injector 18.

In the embodiment of FIG. 4, an electronically-energized injector 18 receives actuation fluid from the common rail passage 42 through a respective rail branch passage 44. The rail branch passage 44 intersects an annulus 52 defined by the cylinder head bore 16 and the injector 18. The annulus 52 more uniformly distributes the relatively high pressure actuating fluid to the injector 18. Due to the location and manufacturing processes of the annulus (in-head), and the intersection of the rail branch passage 44 with the injector bore 16 in the vicinity of the annulus 52, the pressure level needs to be controlled to avoid structural failures. The lengths and effective cross-sectional flow areas of the upstream and downstream portions 46,48 have thus been sized primarily to reduce the cylinder head stress levels in the vicinity of the annulus 52 without degrading the injection performance.

The rail branch passage 44 extends within the cylinder head 14. In one example, the upstream portion 46 has a diameter about 6 to 8 millimeters and the downstream portion 48 has a diameter of about 12 millimeters. This configuration greatly reduces the stress level in the vicinity of the annulus 52, while maintaining flexibility for the initial injection rate control and improvements in the injection pressure. The diameters of the upstream and downstream portions 46,48 of the rail branch passage 44 are considered as dominant parameters for determining the fluid pressure in the annulus 52 but only mildly affect the injection pressure.

The volume of annulus 52 is carefully sized along with the upstream portion 46 and downstream portion 48 of the rail branch passage 44 so that initial injection at idle actuating fluid pressure is started by the volume of actuating fluid existing in annulus 52. By correctly sizing the upstream and downstream portions 46,48 of the rail branch passage 44 a delay occurs in actuating fluid flow from the common rail passage 42 to the respective injector 18 and idle injection pressure is minimized by the limited energy in the volume of annulus 52. The nozzle check of the injector 18 may even temporarily shut. Eventually sufficient flow from the common rail passage 42 raises the injection pressure back up to either sustain or restart injection. The HEUI fuel system 10 can be tuned along with injector nozzle valve opening pressure to achieve a large range of injection durations at idle conditions.

INDUSTRIAL APPLICABILITY

Application of the HEUI fuel system to a particular engine requires attention to fundamental principles of hydraulics and to the wide range of environmental operating conditions of the diesel engine as defined by customer requirements.

The high pressure actuating fluid system provides the actuating means for the HEUI fuel system 10. Injection energy is stored in the high pressure actuating fluid manifold. The high pressure actuating fluid pump pressurizes the manifold to the commanded level. The energy to drive the injection process is available as manifold volume times pressure. Manifold pressure change is defined by the bulk modulus equation:

$$dP = B\,(dV/V)$$

wherein
B = actuating fluid bulk modulus—MPa
dV = actuating fluid volume for one injection—mm$^3$
V = actuating fluid volume of manifold—mm$^3$
dP = pressure change—MPa The actuating fluid volume of the manifold 36 and the pumping capacity of the pump 34 are properly sized for each engine application to attain the desired injection characteristics: namely, peak injection pressure, duration and mean effective injection pressure (MEP). The relatively high pressure actuating fluid pump 34 must provide enough actuating fluid to the injectors 18 at all operating conditions. On engines 12 with high torque rise, the peak torque condition generally requires the highest actuating fluid flow. In other applications, starting conditions will be the key point for properly sizing the manifold 36 and pump 34. An analysis of all the operating conditions is required to assure proper sizing. The actuating fluid flow may be divided into the following portions: requirements of the injector 18, leakage of the pump 34, and other leakage of the hydraulically actuating fluid supplying means 20.

When a selected injector 18 is actuated, actuating fluid flow begins at the poppet seat of the injector 18. A reverse pressure wave is propagated from the injector actuating fluid inlet passage to the actuating fluid manifold 36. The geometry of the injector actuating fluid inlet passage must be designed considering line pressure drop, dynamic wave timing, and the time delay in accelerating the actuating fluid from the manifold 36 to the injector 18.

The embodiments shown of the present invention provide an actuating fluid inlet manifold that is carefully and uniquely configured for purposes of improving (i.e., reducing) the rate of initial injection, improving (i.e., increasing) mean effective injection pressure during the main portion of injection, providing slightly longer injection duration, providing slightly lower actuating fluid flow requirement, exhibiting little change in cold performance, achieving low cost and low variability, providing excellent idle characteristics for electronic control of fuel injection quantity and timing, improving governability due to lower idle and rated fuel delivery knees, reducing adverse flow forces which act on the poppet valve of the injector 18 thereby lowering electrical power requirements for actuating the poppet valve of the injector 18, and/or reducing structural stresses in the cylinder head 14.

Other aspects, objects, and advantages of this invention can be obtained from a study of the drawings, the disclosure, and the appended claims.

We claim:

1. An actuating fluid inlet manifold adapted for a hydraulically-actuated injector fuel system having means for pressurizing actuating fluid and a plurality of hydraulically-actuated injectors adapted to be supplied with actuating fluid from the manifold, said manifold adapted to be positioned in fluid communication between the pressurizing means and the injectors, said manifold having a common rail passage and a plurality of rail branch passages extending from the common rail passage, each rail branch passage adapted to be positioned in fluid communication between the common rail passage and a respective injector, said manifold having fluid dynamic tuning means for controlling the flow of actuating fluid between the manifold and the injectors and thereby reducing the initial rate of fuel injection produced by each of said injectors.

2. An actuating fluid inlet manifold adapted for a hydraulically-actuated injector fuel system having means for pressurizing actuating fluid and a plurality of hydraulically-actuated injectors, said manifold adapted to be positioned in fluid communication between the pressurizing means and the injectors, said manifold having a common rail passage and a plurality of rail branch passages extending from the common rail passage, each rail branch passage adapted to be positioned in fluid communication between the common rail passage and a respective injector, said manifold having fluid dynamic tuning means for controlling the flow of actuating fluid between the common rail passage and the injectors wherein said fluid dynamic tuning means includes a predetermined flow restriction positioned in each rail branch passage of the manifold.

3. The manifold of claim 2 wherein each rail branch passage has an upstream portion positioned closer to said common rail passage and a downstream portion positioned closer to said respective injector, said flow restriction positioned in the upstream portion of the rail branch passage.

4. The manifold of claim 3 wherein the upstream portion of each rail branch passage has a first effective cross-sectional flow area (A1) and first length (L$_1$), said downstream portion of each rail branch passage having a second effective cross-sectional flow area (A2) and second length (L$_2$), the product of the first area (A$_1$)

times the first length ($L_1$) being less than the product of the second area ($A_2$) times the second length ($L_2$).

5. The manifold of claim 3 wherein the downstream portion of each rail branch passage includes a jumper tube connected to a respective injector, said upstream portion of each rail branch passage including a fitting defining said flow restriction relative to the jumper tube and common rail passage.

6. The manifold of claim 3 wherein the downstream portion of each rail branch passage includes a jumper tube connected to a respective injector, said upstream portion of each rail branch passage including an engine member defining said flow restriction relative to the jumper tube and common rail passage.

7. The manifold of claim 6 wherein said engine member is a rocker arm base.

8. The manifold of claim 3 wherein each rail branch passage is an internal passage integrally formed with an engine.

9. An actuating fluid inlet manifold adapted for a hydraulically-actuated injector fuel system having means for pressurizing actuating fluid and a plurality of hydraulically-actuated injectors adapted to be supplied with actuating fluid from the manifold, said manifold adapted to be positioned in fluid communication between the pressurizing means and the injectors, said manifold having a common rail passage and a plurality of rail branch passages extending from the common rail passage, each rail branch passage adapted to be positioned in fluid communication between the common rail passage and a respective injector, said manifold having fluid dynamic tuning means for controlling the flow of actuating fluid between the manifold and the injectors and thereby increasing the mean effective fuel injection pressure produced by each of said injectors during their respective main portion of fuel injection.

10. An actuating fluid inlet manifold adapted for a hydraulically-actuated injector fuel system having means for pressurizing actuating fluid and a plurality of hydraulically-actuated injectors adapted to be supplied with actuating fluid from the manifold, said manifold adapted to be positioned in fluid communication between the pressurizing means and the injectors, said manifold having a common rail passage and a plurality of rail branch passages extending from the common rail passage, each rail branch passage adapted to be positioned in fluid communication between the common rail passage and a respective injector, said manifold having fluid dynamic tuning means for controlling the flow of actuating fluid between the manifold and the injectors and thereby lowering the idle fuel delivery knee of each of said injectors for improving governability.

11. An actuating fluid inlet manifold adapted for a hydraulically-actuated injector fuel system having means for pressurizing actuating fluid and a plurality of hydraulically-actuated injectors adapted to be supplied with actuating fluid from the manifold, said manifold adapted to be positioned in fluid communication between the pressurizing means and the injectors, said manifold having a common rail passage and a plurality of rail branch passages extending from the common rail passage, each rail branch passage adapted to be positioned in fluid communication between the common rail passage and a respective injector, said manifold having fluid dynamic tuning means for controlling the flow of actuating fluid between the manifold and the injectors and thereby lowering the rated fuel delivery knee of each of said injectors for improving governability.

12. A hydraulically-actuated injector fuel system comprising:
means for pressuring actuating fluid;
an engine member having a plurality of injector bores;
a plurality of hydraulically-actuated fuel injectors wherein each injector is positioned in a respective injector bore;
an actuating fluid inlet manifold positioned in fluid communication between the pressurizing means and each injector, said manifold having a common rail passage and a plurality of rail branch passages extending from the common rail passage, each rail branch passage positioned in fluid communication between the common rail passage and a respective injector; and
fluid dynamic tuning means for controlling the flow of actuating fluid between the common rail passage and each of the injectors wherein said fluid dynamic tuning means includes a predetermined flow restriction positioned in each rail branch passage of the manifold and a plurality of annuli defined in the engine member by each respective injector bore and injector, each annulus positioned downstream of a respective rail branch passage and having a volume sized so that the initial injection of a respective actuated injector at idle actuating fluid pressure is started by the volume of actuating fluid existing in the respective annulus.

13. The injector fuel system of claim 12 wherein said engine member is a cylinder head.

* * * * *